June 21, 1960

W. J. SHANAHAN 2,942,251

DATA DISPLAY APPARATUS

Filed Nov. 18, 1955

INVENTOR
WILLIAM J. SHANAHAN

BY Cushman, Darby & Cushman
ATTORNEYS

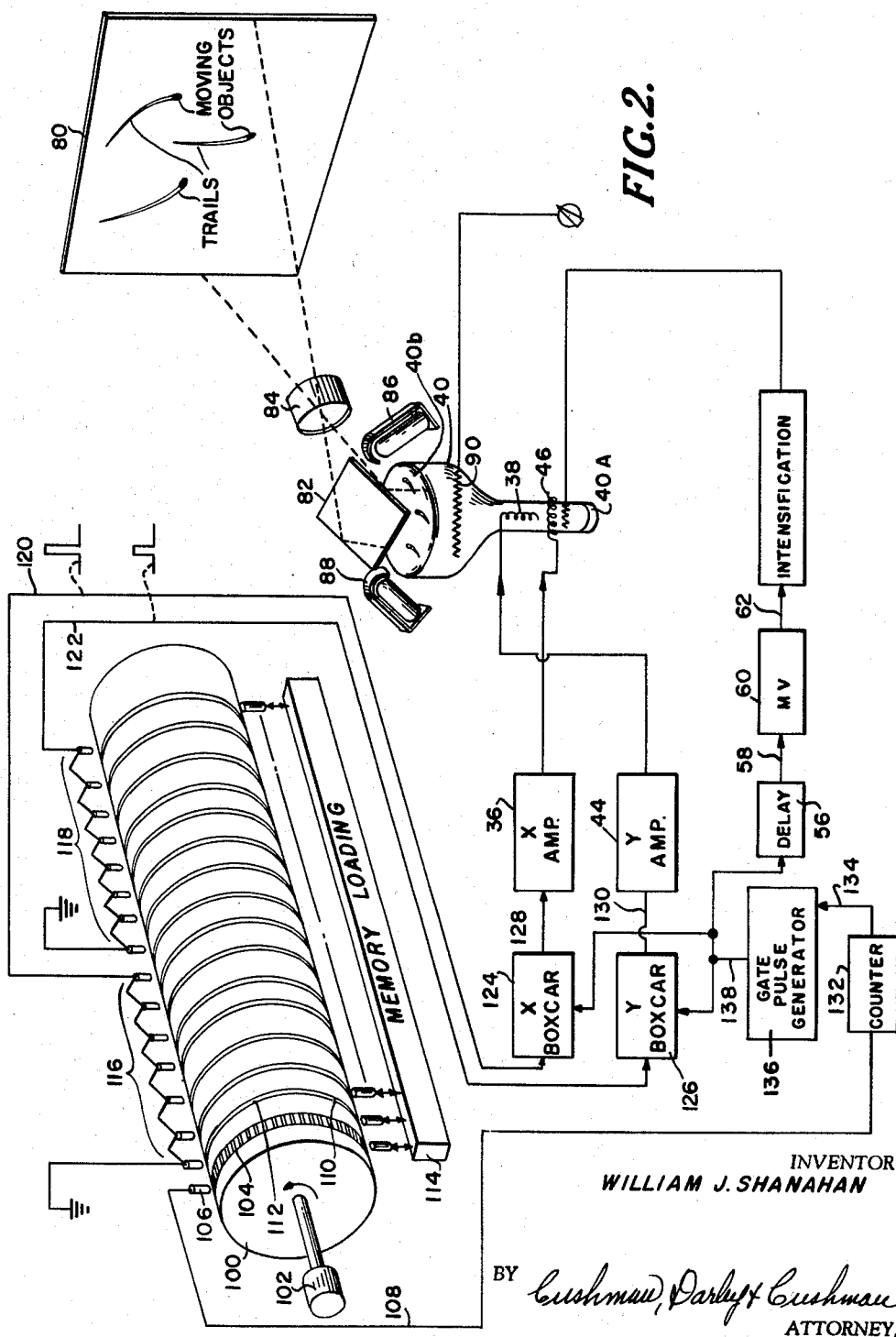

United States Patent Office 2,942,251
Patented June 21, 1960

2,942,251
DATA DISPLAY APPARATUS

William J. Shanahan, New York, N.Y., assignor to Skiatron Electronics & Television Corporation, New York, N.Y., a corporation of New York Filed Nov. 18, 1955, Ser. No. 547,742

7 Claims. (Cl. 340—324)

This invention relates to data display apparatus and particularly to display apparatus for concurrently displaying a plot of a plurality of different items.

To provide an illustrative example of use of the present invention, but without any necessary limitation thereto, the continuous plotting of a number of aircraft as in a commercial aircraft control and landing area may be considered. It is becoming an increasingly complex problem, particularly in periods of poor visibility, to properly maintain a plot of positions, speeds, and expected paths of movement of a number of different aircraft. The use of the present invention provides an excellent solution to such problem.

In general, the present invention provides apparatus for responding to data signals, which may be longitude and latitude coordinate information of moving objects such as aircraft mentioned hereinabove, to provide a continuous plot on a visible display means, of the positions of the moving objects. As another example, the plurality of input signals might represent $x$ and $y$ coordinate data for plotting indicia in rows and columns. As said before, no particular limitation is intended. However, the description will hereinafter proceed with reference to maintaining a plot of the position of moving objects such as aircraft, in order to provide a complete understanding of the generic principles of the invention.

It is a primary object of the invention to provide an improved data display apparatus.

It is a further object of the invention to provide data display apparatus wherein a plurality of sources of data signals available at high repetition rates are sampled at lesser rates and a continuous plot maintained.

It is a further object of the invention to maintain a continuous plot of moving objects wherein each indication of each object will show a past history of the movement of the object.

It is a further object of the invention in keeping with the preceding objects, to provide apparatus including a member having a layer of ionic crystalline material wherein opacity centers of predetermined and/or controllably long persistence may be established.

Many further objects of the invention will be in part expressed and in part obvious from the following detailed description of the illustrative embodiments and from the appended claims, and no limitation to the illustrative embodiments is intended.

The illustrative embodiments of the invention may be best understood with reference to the accompanying drawings, wherein:

Figure 2 shows a second embodiment of the invention.

Figure 1:
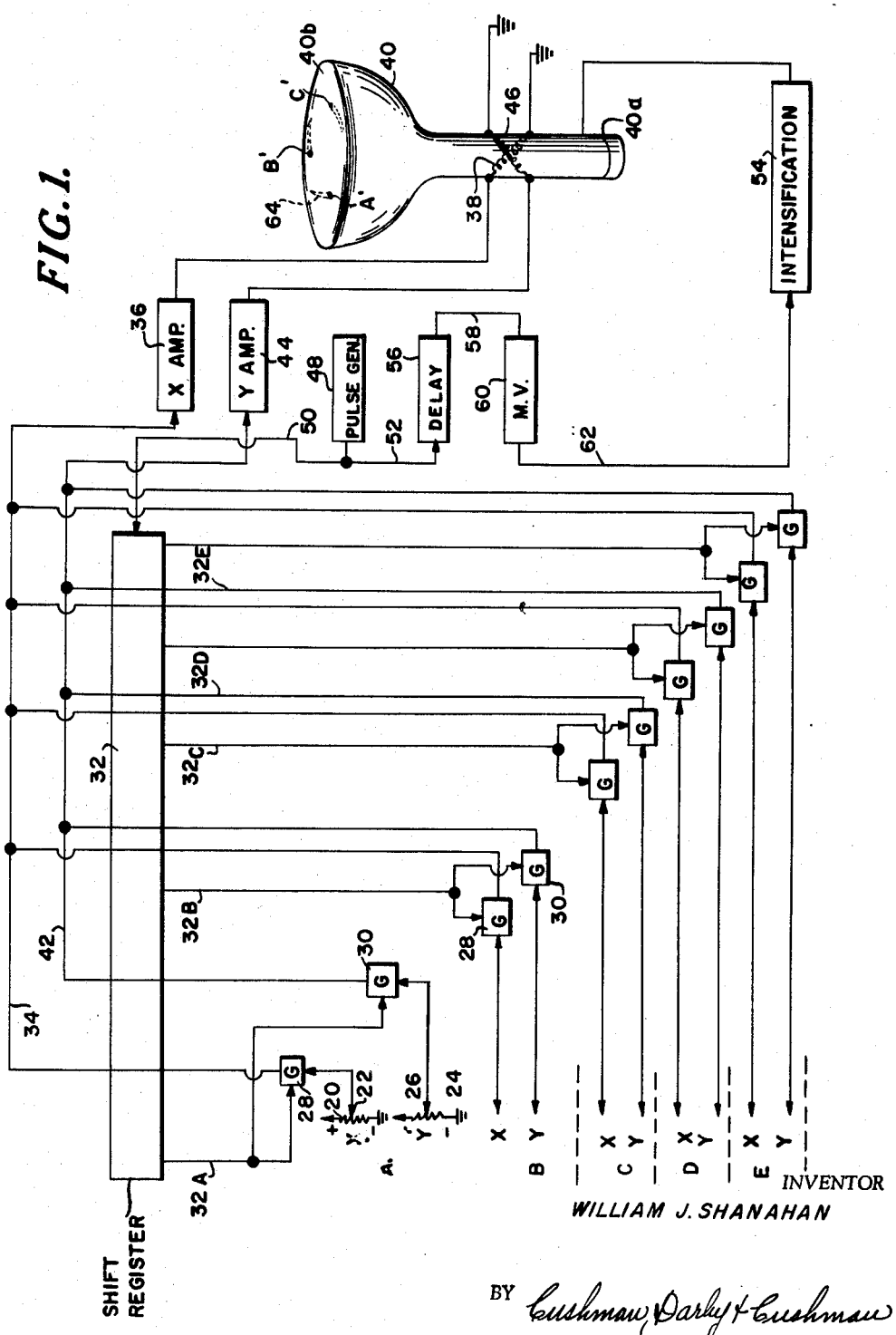
Figure 1 shows a first embodiment of the invention.

Now referring to the left-hand end of Figure 1, A, B, C, D and E indicate what may be termed data signal input channels. It will be understood that there may be an indefinitely greater number of channels and only five are illustrated for convenience. In each channel a resistor 20 having an adjustable tap 22 thereon is provided for being set to tap off a voltage which may form one data signal of a pair of signals for the given channel. The resistor 20 may be connected across a source of potential, as shown by symbols in Figure 1. The other data signal of each channel may be tapped off as at an adjustable point 24 on a resistor 26. For convenience, the first mentioned signal may be referred to as the $x$ coordinate signal and the second signal, the $y$ coordinate signal.

It may be assumed that the $x$ and $y$ controls in each of the channels A–E is available, for example, for setting up from time to time last reported or detected position of a moving object such as an aircraft. The values $x$ and $y$ may be manually set from time to time, or automatically set by any equipment responsive to a radar search or the like.

In each of the channels A–E there is a first gate circuit 28 for the $x$ side of the channel, and a second gate 30 for the $y$ side of the channel. Each gate 28 and 30 in each channel is to be energized in parallel over a line extending from a shift register 32. The enabling line for gates 28 and 30 in channel A is designated 32A, the enabling line for channel B is 32B, etc. The outputs of all of the gates 28 are connected in common to a line 34 which serves as an input to an $x$ deflection amplifier 36. The output of the deflection amplifier 36 may be applied to one set of deflecting means 38 of a display device 40. The outputs of all of the gates 30 are similarly connected in common to a line 42 which serves as an input to a second or $y$ deflection amplifier circuit 44. The output of circuit 44 is applied to a second deflection means 46 of the display device 40. The deflection means 38 and 46 usually will be at right angles, to control in the usual manner the deflection of a beam of radiant energy, preferably an electron beam, generated by the conventional means (not shown) adjacent the base 40a of the display device. In the general case, the display means will comprise means for determining the instantaneous position of indication on a display area.

The shift register 32 may be one of any number of known counting rings or the like for successively enabling the output lines 32A, 32B, etc. in cyclic sequence. For this purpose, a master pulse generator 48 may be provided as a source of system timing or clock pulses. Each pulse will be applied over output line 50 as a driving input into the shift register. Thus, upon the occurrence of each pulse, the enabling output will be shifted from one of the output lines of the register to the next, for example, from line 32A to line 32B. As an example, the "enabled" one of the output lines may carry a relatively high potential, to open the gates 28 and 30 connected thereto, while the remaining shift register output lines may be at a relatively low potential which is insufficient to open any of the gates. The arrangement may be such that the register will shift shortly after the beginning of a pulse from generator 48 over line 50 and the enabling condition will be maintained until the next occurrence of a pulse. This should be a period of time sufficient to permit the deflection potentials or magnetic fields, as the case may be, to settle in the display device 40.

Pulses are tapped over line 52 from line 50 for the purpose of operating an intensification control device 54 to activate the display means during the period of time that a particular one of the shift register output lines is enabled. Preferably the pulse on line 52 is applied to a delay device 56 to give the deflection means time to settle, and the delayed pulse on line 58 is then applied to a multivibrator 60 or similar circuit for prolonging the pulse applied over line 62 to the intensification circuits 54.

The operation of the apparatus as thus far described may be summarized as follows: positional or other data in the form of *x* and *y* signals for two coordinates, is sampled in sequence through the gates 28 and 30 in each of channels A–E, as the shift register cycles under control of the pulse generator 48. During the period of enabling of any one of the output lines of the shift register, the deflection means 38 and 46 of the display device 40 will be activated. During and within this activation period, the intensification circuit 54 will be operated to "turn on" the display means, so to speak, so as to show a spot on the face 40b of the display means. For example, signals in input channel A may show a spot A'. Similarly, input signals from channel B may show a spot B' and signals from channel C may show a spot C'. As will be described in greater detail in connection with Figure 2 hereinbelow, the presentation on face 40b of the display means may be projected onto a larger surface if desired.

The display device 40 is preferably equipment known widely in the trade as a Skiatron, this being a trade mark of the Skiatron Electronics & Television Corporation of New Work. Such devices are characterized by means for generating the beam of radiant energy, usually a cathode ray beam, and impinging this beam upon a screen which includes a layer of an ionic crystalline material. The property of the crystalline material is to have created therein so-called "opacity centers." Usually, the screen and layer are transparent and the opacity centers appear as dark spots, or traces if the spot is moved. It is possible, however, to have the screen opaque and the opacity centers appear as transparent areas. A complete understanding of Skiatron tubes may be had by reference to United States patent to Rosenthal Re. 22,734 assigned to the assignee of the present invention.

By use of a Skiatron display device, the presentation of the data is greatly enhanced. The persistence of the opacity centers and therefore the spots may be controlled at will, either by provision of special erasure means, or simply by the characteristics of the device as manufactured. The persistence may be such in relation to the cyclic time of the shift register 34 that the dot previously recorded is of substantial boldness when the next presentation is made of the same data. If it be supposed that the input in the various channels A–E is changing fairly rapidly due to motion of an aircraft for example, the persistence of the spot, which gradually diminishes, will have the effect of leaving a trail, designated 64 in Figure 1, of gradually diminishing boldness. It will be immediately apparent that this trail gives a visual sense of the track history of the moving object, as well as a sense of its velocity.

Another important feature of the use of a Skiatron type display device 40, is that regardless of the frequency of change from one set of input signals to another, which usually will require a change in the deflection potentials or magnetic fields or the like. The respective channel presentations may be separated so as to have the frequencies of the signals applied to the deflection means of low enough value so as to be workable. This feature of the invention will become more clear with regard to Figure 2, which is now described.

In Figure 2 components corresponding to those in Figure 1 are identified with like reference characters. In this figure there is additionally illustrated exemplary projection apparatus, usable also with the display device 40 of Figure 1, for projecting the presentation onto a large screen 80. This equipment includes a mirror 82, a lens assembly 84, and projection lamps with light shields 86 and 88. The display device 40 of Figure 2 is further shown equipped with a variable erasure means 90. However, as mentioned hereinabove, the persistence characteristics may be built into the tube for a given application and in such situation, a variable erase control is not required, nor is any erase control device required apart from the inherent erase characteristics of the ionic screen layer itself.

The apparatus illustrated in Figure 2 further comprises an arrangement whereby data signals are repetitively scanned at a high rate, and yet by a sampling technique, production of the signals to the display device is at a lower repetitive rate.

Figure 2 shows a drum 100 of the type which may have magnetizable tracks on its periphery. Such drums are now widely known in the art. A motor 102 is provided to rotate the drum at a reasonably constant rate of speed. However, synchronization is afforded to the system by the recording thereon of evenly spaced magnetic spots or cells, along a timing track 104. A timing or clock pulse transducer 106 may be positioned in operative relation to the timing track 104, to produce on line 108 a series of timing or clock pulses. Another track 110 may be provided with a starting point pulse 112 for use in locating given angular positions of the drum for loading remaining tracks shown to the right of track 110 in Figure 2, with given data. Block 114 designates loading circuits, which will not be explained in detail in the present application, inasmuch as the same are now well known in the art, and form no part of the present invention.

It may be assumed that in each angular position of the drum as marked off by the location of the clock pulses in track 104, there may be contained digital data for read-out by a first group of parallel positioned transducers beneath bracket 116, and a second group of read-out transducers under bracket 118. Let it be assumed that in the tracks beneath the transducer 116, there are one or more remnant flux cells or spots which will, when passing beneath the transducers, serve to generate at a given moment in transducers 116, a voltage pulse on line 120 which in amplitude shows a given analogue value corresponding to the digital information. In the simplest form, and as shown in Figure 2, the reading windings of the several transducers 116 can be connected in series. Thus, in any given set of parallel positioned binary bits retained in the associated tracks, a pulse of given amplitude will be produced on line 120. A similar situation may prevail for producing a pulse of predetermined amplitude on line 122. The pulse on line 120 can be for generating an *x* coordinate pulse, and the pulse on line 122, may be a *y* coordinate pulse.

It will be apparent that the digital to analogue conversion can be by means of a more elegant circuitry, so as to take full advantage of the possible binary combinations of retained cells of magnetization in the tracks 116, or tracks 118, as the case may be.

It may further be assumed that there are, for example, 200 timing cells along the circumference of timing track 104, and therefore the remainder of the drum is divided up into a similar number of parallel divisions. Let it be assumed that in each of the 200 positions around each of the tracks 116 and 118, there is recorded in each successive parallel position, a set of data for the *x* and *y* coordinates representative of the last reported position of a moving object such as a commercial aircraft. It may be further assumed, however, that the speed of rotation of the drum 100 is such that if pulses in sequence were to be applied to the deflection means 38 and 46 of the display device 40, the repetition rate would be too great to permit the deflection potentials or magnetic fields to settle properly. To accommodate this situation, the *x* coordinate line 120 is connected as an input to a so-called boxcar pulse stretching circuit 124, and the *y* coordinate line 122 is similarly connected to a boxcar circuit 126. The circuits 124 and 126 are of the variety known in the art usually made up of a gate circuit followed by a capacitance device such that when the gate opens the capacitive means is charged to a value representative of the amplitude of an incoming pulse. When the gate closes at the conclusion of the incoming pulse, the capacitive element is left with the just mentioned charge, which endures over a considerable period. Thus, if successive incoming pulses are of different amplitudes, the output, as on line 128 from circuit 124, or line 130 from circuit 126, is stepped.

The output line 128 of boxcar circuit 124 is connected as an input to the *x* deflection amplifier 36. The line 130 from boxcar circuit 126 is applied as an input to the *y* deflection amplifier 44.

The line 108 which carries clock pulses is applied as the input to a counter circuit 132 which gives an output pulse on line 134 only after a predetermined number of input pulses. The output pulse on line 134 is applied as an input to a gate pulse generator circuit 136 which generates a pulse of sufficient amplitude to open the gate portions of boxcar circuits 124 and 126 for a period within the duration of a single pulse on each of lines 120 and 122 representative of digital data showing the position of one of the craft. It will be understood that the enabling pulse on line 138 from gate pulse generator circuit 136 is of duration commensurate only with the clock pulse on line 108. However, the boxcar circuits serve to stretch the pulse signals on lines 128 and 130 over the period between outputs of counter 132.

The output of gate pulse generator 136 is further connected as an input to delay 56, and accordingly the beam in display device 40 is energized within the duration of the deflection control signals on lines 128 and 130.

The operation of the apparatus shown in Figure 2 may be traced as follows: By use of the memory loading circuitry 114, each of the 200 positions in each of the data tracks may be filled with the last reported positional information on various aircraft (as an example) and this information may be changing from time to time as reports of positions are incoming through the loading circuits 114. The changes may be so rapid that a reloading operation is carried out as every successive circumferential position of the drum passes the loading transducers. In any event, the lines 120 and 122 carry a repetitive series of pulses at a rate of 200 for every drum revolution. The amplitudes of the respective pulses on the *x* line 120 and the *y* line 122 vary to show the relative analogue *x* and *y* values.

However, the counter 132 may comprise sufficient stages or the like to produce an output pulse on line 134 only for say 201 input clock pulses. Thus, the pulses on lines 128 and 130 start only about every drum revolution, and endure for the time period determined by the next output on line 134, without being affected by the intervening pulses on lines 120 and 122. It may be said that the reading from the 200 positions about the drum 100 is caused to be "precessed" by virtue of the fact that the total capacity of counter 132 differs from the total capacity of the tracks of the drum. It will be understood that the counter 132 may have a capacity less than the capacity of the tracks, whereby the precession is in a direction opposite to that which will occur if the capacity of the counter is greater than the capacity of the drum.

It will be understood that the specific apparatus shown in Figures 1 and 2 and described in detail hereinabove are given only for purposes of illustration and the true scope of the invention is to be determined by the appended claims.

1. Data display apparatus comprising means for generating a cyclicly repetitive series of pairs of signals, each pair of signals being of predetermined time duration, the amplitude of each signal of each pair being representative of a coordinate for plotting a display indication in two dimensions, a display means including means for generating a beam of radiant energy, means to control the intensity of said beam, means to deflect the beam in a first direction, means to deflect the beam in a second direction, and screen means to receive said beam to show a spot indication during successive instants of time while the beam is of sufficient intensity, the apparatus further including means to couple one signal of each pair to the first deflection means and to couple the other signal of each pair to the second deflection means during the interval of generation of each pair of signals, means to operate the beam intensity control means to enable the display means to show a spot only within the time perod of said coupling of said generated signals to said deflection means, and means to operate the respective deflection means to maintain the spot stationary within the time period of operation of the beam intensity means.

2. Data display apparatus comprising means for generating a cyclicly repetitive series of pairs of signals, each pair of signals being of predetermined time duration, the amplitude of each signal of each pair being representative of a coordinate for plotting a display indication in two dimensions, a display means including means for generating a beam of radiant energy, means to control the intensity of said beam, means to deflect the beam in a first direction, means to deflect the beam in a second direction, and screen means to receive said beam to show a spot indication during successive instants of time while the beam is of sufficient intensity, the apparatus further including means to couple one signal of each pair to the first deflection means and to couple the other signal of each pair to the second deflection means during the interval of generation of each pair of signals, means to operate the beam intensity control means to enable the display means to show a spot only within the time period of said coupling of said generated signals to said deflection means, the coupling means including means to sample pairs of said generated signals from the signal generating means only once every predetermined fraction of said cycle of said repetitive series so that the sampling precesses to sample signals at a repetition rate less than the maximum possible rate of generation of said signals.

3. Data display apparatus comprising means for generating a cyclicly repetitive series of pairs of signals, each pair of signals being of predetermined time duration, the amplitude of each signal of each pair being representative of a coordinate for plotting a display indication in two dimensions, a display means including means for generating a beam of radiant energy, means to control the intensity of said beam, means to deflect the beam in a first direction, means to deflect the beam in a second direction, and screen means to receive said beam to show a spot indication during successive instants of time while the beam is of sufficient intensity, the apparatus further including means to couple one signal of each pair of the first deflection means and to couple the other signal of each pair to the second deflection means during the interval of generation of each pair of signals, means to operate the beam intensity control means to enable the display means to show a spot only within the time period of said coupling of said generated signals to said deflection means, and including counter means responsive to the generation of the pairs of signals to produce an output signal upon reaching a count different from the total number of pairs of signals in each cycle of said series to cause the sampling to precess over the range of signals.

4. Apparatus as in claim 2 and further including means to prolong the sample signals substantially the length of the time interval between samplings.

5. Apparatus as in claim 4 wherein said screen comprises a layer of ionic crystalline material in which opacity centers are created by impingement of the beam of radiant energy thereon, the layer having an opacity center persistence sufficient to show a spot in substantial boldness after at least one sampling cycle is completed.

6. Apparatus as in claim 3 wherein the signal generating means includes transducer means operated in proximity to a cyclicly moving member wherein successive cells contain retained magnetization indicative of different data, and the apparatus includes means associated with the movable member for generating clock pulses, the counter means being responsive to the clock pulses.

7. Data display apparatus comprising means for generating a cyclically repetitive series of pairs of signals, a characteristic of each signal of each pair being representative of a coordinate value for plotting a display indication in two dimensions, a display means including means for selectively generating an indicia thereon, means to control the generating means to selectively create and remove the indicia on said display means, means to deflect the possible position of the indicia in a first direction, means to deflect the possible position of the indicia in a second direction, the display means including means to show the indicia during successive instants of time during which the indicia control means is operative to create the indicia, the apparatus further including means to couple one signal of each pair to the first deflection means and to couple the other signal of each pair to the second deflection means during the interval of generation of each pair of signals, and means to operate the indicia control means to enable the display means to show the indicia and maintain same stationary only within the time period of said coupling of said generated signals to said deflection means.

References Cited in the file of this patent

UNITED STATES PATENTS

| | | |
|---|---|---|
| 2,330,171 | Rosenthal | Sept. 21, 1943 |
| 2,378,383 | Arndt | June 19, 1945 |
| 2,434,644 | Fairweather | Jan. 20, 1948 |
| 2,594,731 | Connolly | Apr. 29, 1952 |